United States Patent [19]

Baugh

[11] Patent Number: 5,412,944

[45] Date of Patent: May 9, 1995

[54] SEVERE SERVICE EXTRACTOR VALVE

[76] Inventor: Benton F. Baugh, 14626 Oak Bend, Houston, Tex. 77079

[21] Appl. No.: 190,858

[22] Filed: Feb. 3, 1994

[51] Int. Cl.[6] .............................................. F01N 3/20
[52] U.S. Cl. ........................................ 60/281; 60/315; 60/613
[58] Field of Search ................ 60/281, 613, 315, 272, 60/273, 274; 123/DIG. 5

[56] References Cited

U.S. PATENT DOCUMENTS

| | | | |
|---|---|---|---|
| 2,175,463 | 10/1939 | Haring | 60/281 |
| 2,392,711 | 4/1944 | Willenborg | 60/281 |
| 2,966,036 | 12/1960 | Stowens | 60/281 |
| 3,500,635 | 3/1970 | Roper | 60/281 |
| 3,939,656 | 2/1976 | Goldfein | 60/281 |
| 4,811,558 | 3/1989 | Baugh | 60/281 |
| 5,267,838 | 12/1993 | Baugh | 417/244 |

*Primary Examiner*—Ira S. Lazarus
*Assistant Examiner*—Daniel J. O'Connor

[57] ABSTRACT

A method for cooling the parts of an extractor valve assembly to workable levels by cooling a portion of the produced gases and mixing it with the newly produced gases to lower the average temperature of the gases produced which is seen by the valving means and by recirculating engine oil along the production tubes to precool the gases before they arrive at the valving means.

20 Claims, 2 Drawing Sheets

SEVERE SERVICE EXTRACTOR VALVE

BACKGROUND OF THE INVENTION

The field of this invention the production of nonflammable gases for use in drilling and service operations such as in oil and gas wells. The basic process extracts engine exhaust gas directly from the cylinders of an internal combustion engine; and then scavenges, cools, cleans, and compresses it for sale to clients.

The nonflammable gas can be used for underbalanced drilling, geothermal drilling, lightening oil well fluids to initiate production, well cleaning, fracing, and other well operations.

Historically, most of these operations have been done by an expensive cryogenic liquid nitrogen process. The proposed process have substantial economic and environmental advantages relative to the cryogenic nitrogen processes, however, the high temperatures inherent in high pressure exhaust production has provided a need for necessary solutions to make it practical.

SUMMARY OF THE INVENTION

The object of this invention to provide temperature reductions on exhaust gas extraction means which will extend their service lives.

A second object of the present invention is to recirculate produced and cooled exhaust gas past valve parts within a high pressure environment to yield an average ambient temperature in which the working parts can survive.

A third object of the present invention is recirculate oil past key components in the extractor valve assembly to afford cooling of the parts.

Another object of the present invention is recirculate oil past key components in the extractor valve assembly to assist in the cooling of the gases within the parts.

Another object of the present invention is to provide reductions in the outer surface temperatures of the components for environmental and human safety.

DESCRIPTION OF THE PREFERRED EMBODIMENT

Figure 1:
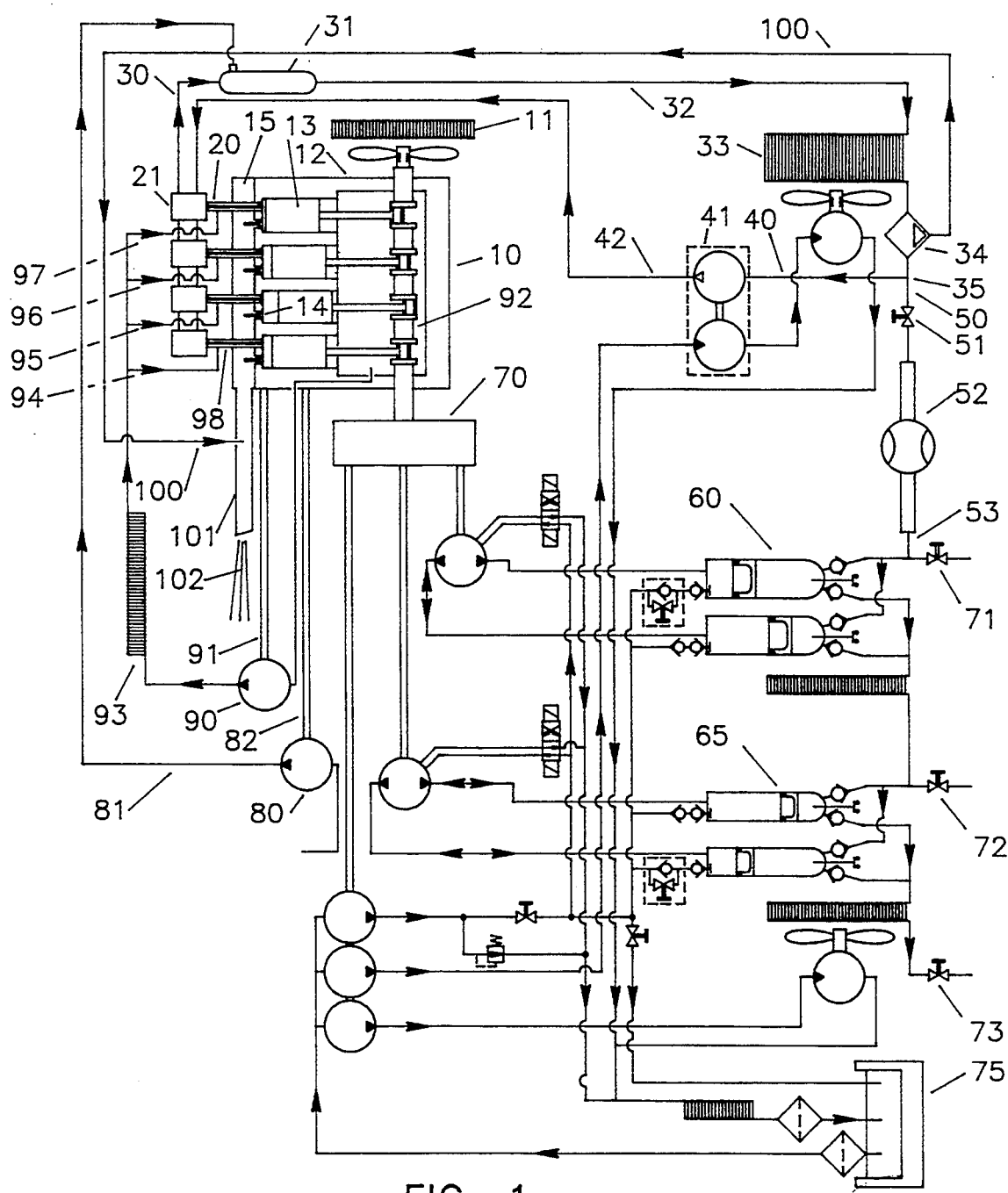
FIG. 1 is a an overall circuit drawing of a Baugas Service Gas System which incorporates and demonstrates the application of this invention.

Referring now to FIG. 1, FIG. 1 is a an overall hydraulic circuit drawing of a service gas generation system which incorporates and demonstrates the application of this invention.

The system is built around a standard internal combustion engine 10, having a radiator 11, a block 12, pistons 13, valves 14, and a head 15. The engine can be a 2 cycle or 4 cycle engine, depending upon a variety of conditions. In this case some of the conventional exhaust valves 14 are replaced by riser tubes 20 which have extractor valves 21 installed on each of them.

During the normal compression cycle in the internal combustion engine the remaining exhaust valves 14 operate normally. The extractor valves 21 are manufactured to allow opening and production of some of the cylinder head gases past the extractor valve after the combustion has been initiated. During a portion of each rotation of the engine on 2 cycle engines or on every other rotation on a 4 cycle engine, hot gases will be produced past the valve means within the extractor valve assembly.

Produced gases are taken out line 30, thru converter 31, thru line 32, thru cooler 33, thru dehydrator/cleaner 34, and to the tee 35.

A portion of the cooled gases at tee 35 are taken thru line 40, thru recirculator pump 41, thru line 42, and back into the extractor valves 21. The constant recirculation caused by recirculator pump 41 causes cooled exhaust gases to be pumped across the extractor valves 21, giving a continuous cooling to the internal parts. Without the benefits of cooling techniques such as this, the temperatures of the high temperature produced gases are high enough to degrade the valve mechanisms.

The portion of the gases drawn off along line 50 from tee 35, thru control valve 51, thru flow rate meter 52, and along line 53 is the volume of gases delivered to the end user.

Secondary compressor system 60 and tertiary compressor system 65 utilize excess horsepower from the engine 10 thru the power takeoff assembly 70 to compress the produced gases to higher levels for various applications. For additional information on this compression process, refer to U.S. Pat. No. 5,276,838. Various service operations will require pressure as high as 5000 p.s.i. and 10,000 p.s.i. Produced gas can be taken thru outlet valves 71, 72, or 73, depending upon the secondary compression required for a particular application.

Fuel pump 80 draws fuel from the fuel tank used by engine 10 or from other fuel sources if a separate fuel or chemical injection is desired. This fuel is pumped along line 81 to converter 31. The fuel pump 80 is shown driven by shaft 82 off one of the drives on the rear of engine 10.

Oil pump 90 is shown driven by shaft 91 off one of the rear drives of engine 10 and drawing oil directly from the crankcase 92 of engine 10. The oil passes thru cooler 93, along lines 94–97 and into an annular circulation area 98 of the riser tubes 20. This oil serves to cool the riser tubes and then is vented into the head 15 of engine 10 and allowed to flow by gravity back to the crankcase 92.

Liquids separated from the produced gas by the dehydrator/cleaner 34 are taken by line 100 to the engine exhaust system 101 for revaporization as exhaust gas 102.

Figure 2:
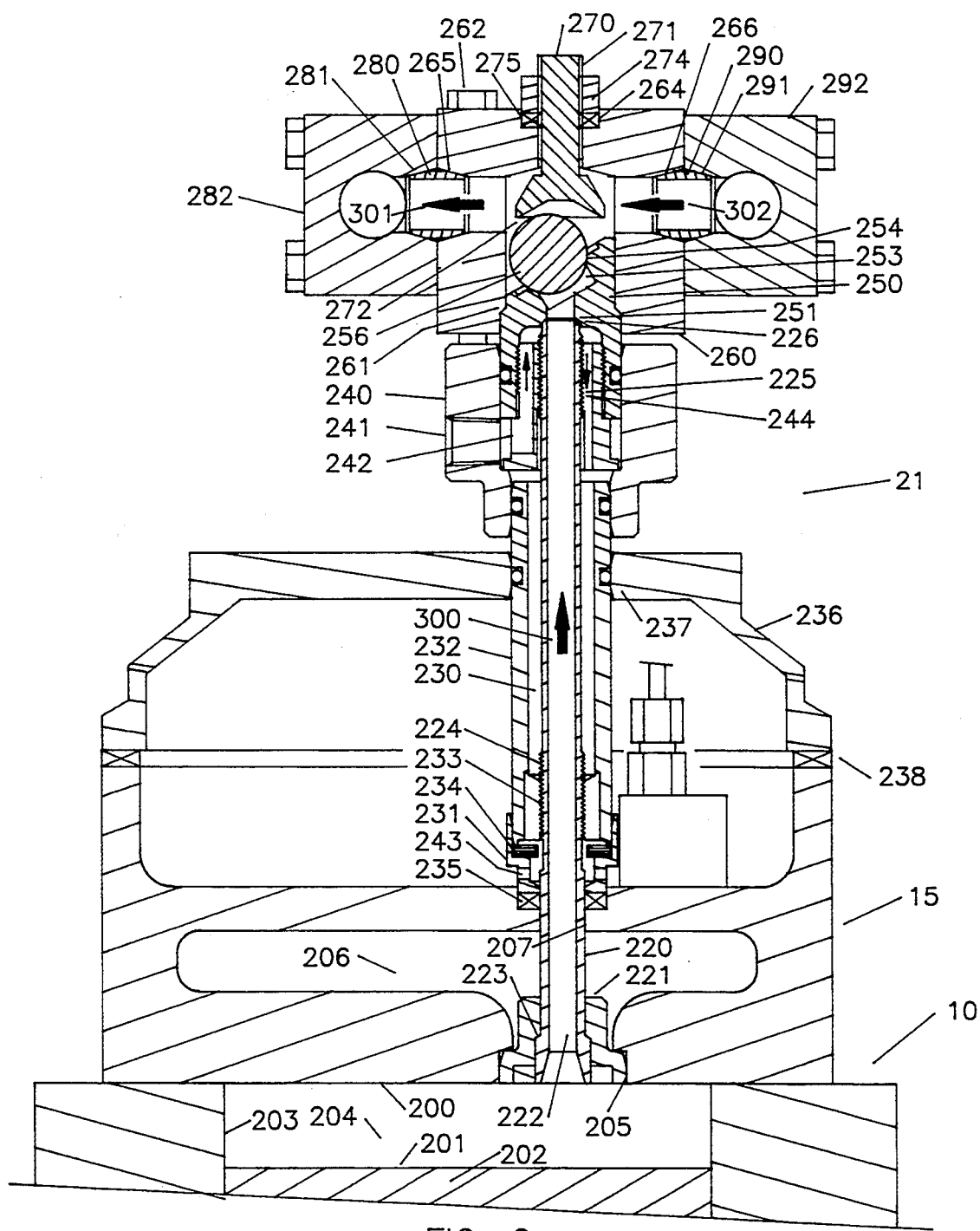
FIG. 2 is a half section drawing of an extractor valve assembly which incorporates this invention.

Referring now to FIG. 2, head 15 is shown which is a portion of engine 10 in FIG. 1. The lower portion 200 of the head 15, the upper portion 201 of piston 202, and the wall of the cylinder 203 form the combustion chamber 204 of the engine.

Seat pocket 205, exhaust passage 206, and bore 207 allow for the insertion of the riser tube 220 and the spacer 221 into the head 15.

Riser tube 220 has a bore 222 for communication of gases away from the combustion chamber 204, a shoulder 223 for trapping spacer 221 in place in the seat pocket 205, an intermediate thread 224, an upper thread 225, and an upper seal area 226.

An annular passageway 230 is formed outside the riser tube 220 and within lower sleeve 231 and upper sleeve 232. Upper sleeve 232 has an internal thread 233 which engages intermediate thread 224 and when engaged holds down on conical spring washers 234, lower sleeve 231, and packing 235.

Rocker cover 236 seals around the upper sleeve 232 with O-Ring 237 and seals to the head 15 with seal 238.

Cooling body 240 receives oil from one of lines 94–97 on FIG. 1 at a port 241, sends it thru bypass sleeve 242, down the annular area 230 outside the riser tube 220 and inside upper sleeve 232 and lower sleeve 231, and out ports 243 on lower sleeve 231. The oil will then return to the engine crankcase by gravity flow.

Bypass sleeve 242 has an internal thread 244 which engages the upper thread 225 to hold the cooling body 240 onto the riser tube 220.

Seat 250 has a lower seal pocket 251 for engaging seal area 226. Seat 250 also provides internal passage 253 and valve seat 254 for ball 256.

Valve body 260 sealingly engages seat 250 at metal shoulder 261 and is held together by bolting 262 (partially shown). Valve body 260 provides an upper seal pocket 264, outlet seal pocket 265, and inlet seal pocket 266.

Adjustable stop 270 has thread 271 for engaging valve body 260, and provides stop shoulder 272 for ball 256. Adjustable stop 270 sets the limitation in the travel allowed for the ball 256 between the closed position on its seat 254 and the fully open position. Gland 274 loads packing 275 into seal pocket 264 to seal against threads 271.

Seal ring 280 engages seal pocket 265 on the valve body 260 and seal pocket 281 of outlet manifold 282. Outlet manifold 282 communicates the produced gases away from the extractor valve assembly 21 thru line 30 on FIG. 1.

Seal ring 290 engages seal pocket 266 on the valve body 260 and seal pocket 291 of inlet manifold 292. Inlet manifold 292 communicates the cooling gases into the extractor valve assembly 15 from line 42 on FIG. 1.

Arrow 300 shows the direction of flow of gases directly from the combustion chamber of the internal combustion engine. These gases can at times be at temperatures which exceed the approximately 2400 degrees Fahrenheit melting point of the metals of which the parts are manufactured. As described before, engine oil is circulated down the exterior of the riser tube 220 to keep the riser tube itself within a reasonable operating temperature.

In normal operation, arrow 301 shows the direction in which the high temperature gases will pass thru the valve seat 254 and past ball 256 only about one quarter of the time or less. The remaining three quarters of the time the valve parts within the valve body 260 would still be exposed to the hot gases. This invention introduces a portion of the cooled gases in the range of 100–200 degrees Fahrenheit into the inlet and across the valve parts for this ¾this time period, and gives an average ambient temperature more in the range of 700 degrees Fahrenheit. This critical reduction in the average temperature is essential to the long term service life of the components within the extractor valve, and to reduced outer surface temperatures on various metal components.

The foregoing disclosure and description of this invention are illustrative and explanatory thereof, and various changes in the size, shape, and materials as well as the details of the illustrated construction may be made without departing from the spirit of the invention.

I claim:

1. A method for the extraction of a gas mixture under pressure from the combustion chamber of an internal combustion engine into a receiver circuit comprising:
   a riser tube for communicating said gas mixture from said combustion chamber within said internal combustion engine to a location outside said engine,
   a valve seat,
   valve means to engage said valve seat,
   a valve body containing said valve seat and said valve means, said valve body having a valve body outlet and a valve body inlet,
   wherein said valve means is urged toward said valve seat by the pressure in said valve body when said pressure in said valve body exceeds the pressure in said riser tube, and wherein said valve means is urged away from said valve seat by the said pressure in said riser tube when said pressure in said riser tuber exceeds said pressure in said valve body,
   said receiver circuit receiving said gas mixture which passes from said combustion chamber past said valve means and out of said valve body outlet,
   cooler means in said receiver circuit to cool said gas mixture received from said valve body outlet,
   a gas recirculator means for recirculating a portion of said cooled gas mixture which passes thru said cooler means back to said valve body inlet,
   such that said cooled gas mixture will mix with currently produced gas mixture thereby reducing the temperature of said currently produced gas mixture,
   a sleeve around said riser providing an annular area between said riser tube and said sleeve
   an oil pumping means which pumps oil down said annular area between said riser tube and said sleeve to cool said riser tube and said gas mixture as said gas mixture flows within said riser tube.

2. The invention of claim 1, wherein said valve means is one or more balls.

3. The invention of claim 1, wherein said gas recirculator means is a positive displacement gas pump.

4. A method for the extraction of a gas mixture of a first temperature from a combustion engine into a receiver circuit comprising:
   a valve seat,
   valve means to engage said valve seat,
   a valve body containing said valve seat and said valve means, said valve body having a valve body outlet and a valve body inlet,
   said receiver circuit receiving said gas mixture which passes from said combustion engine past said valve means and out of said valve body outlet,
   means for circulating a portion of a cooling gas mixture of a second temperature into said valve body inlet, said second temperature being lower than said first temperature,
   such that said cooling gas mixture will mix with said gas mixture thereby reducing the temperature of said gas mixture.

5. The invention of claim 4, wherein said valve means is one or more balls.

6. The invention of claim 4, wherein said gas recirculator means is a positive displacement gas pump.

7. The invention of claim 7, wherein a pressure relief valve is included in the circuit to limit the maximum pressure differential seen across said positive displacement pump.

8. The invention of claim 4, wherein said gas mixture is cooled and becomes said cooling gas mixture.

9. The invention of claim 8, wherein a portion of said gas mixture is continuously recirculated around said receiver circuit for cooling of said valve means within said valve body.

10. The invention of claim 4, wherein said combustion engine is an internal combustion engine.

11. The invention of claim 10, wherein said internal combustion engine is a diesel engine.

12. The invention of claim 11, wherein said diesel engine is a two cycle diesel engine.

13. The invention of claim 10, further comprising a riser tube for communicating said gas mixture from a combustion chamber within said internal combustion engine to a location outside said engine.

14. The invention of claim 13, further comprising a sleeve around said riser providing an annular area between said riser tube and said sleeve and
 an oil pumping means which pumps oil down said annular area between said riser tube and said sleeve to cool said riser tube and said gas mixture as said gas mixture flows within said riser tube.

15. The invention of claim 14, further comprising said oil being drawing from the crankcase of said internal combustion engine, and said oil being allowed to return to said crankcase of said internal combustion engine after cooling said riser tube and said gas mixture.

16. The invention of claim 4, further comprising an adjustable stop means which can be adjusted to control the stroke of said valve means.

17. The invention of claim 4, further comprising an adjustable stop means which can be adjusted to mechanically close off said valve means.

18. A method for the extraction of a gas mixture under pressure from the combustion chamber of an internal combustion engine into a receiver circuit comprising:
 a riser tube for communicating said gas mixture from said combustion chamber within said internal combustion engine to a location outside said engine,
 a sleeve around said riser providing an annular area between said riser tube and said sleeve
 an oil pumping means which pumps oil down said annular area between said riser tube and said sleeve to cool said riser tube and said gas mixture as said gas mixture flows within said riser tube.

19. The invention of claim 18, wherein said oil is drawn from the crankcase of said internal combustion engine, 20. The invention of claim 19, wherein said oil is allowed to return to said crankcase of said internal combustion engine after cooling said riser tube and said gas mixture.

* * * * *